(12) United States Patent
Huh

(10) Patent No.: US 8,659,241 B2
(45) Date of Patent: Feb. 25, 2014

(54) LED LAMP

(76) Inventor: Sea-Kyoung Huh, Seoul (KR)

( * ) Notice: Subject to any disclaimer, the term of this patent is extended or adjusted under 35 U.S.C. 154(b) by 101 days.

(21) Appl. No.: 13/295,114

(22) Filed: Nov. 14, 2011

(65) Prior Publication Data

US 2012/0119654 A1    May 17, 2012

(30) Foreign Application Priority Data

Nov. 15, 2010   (KR) ........................ 10-2010-0113134

(51) Int. Cl.
*H05B 37/00* (2006.01)
*H05B 39/00* (2006.01)
*H05B 41/00* (2006.01)

(52) U.S. Cl.
USPC ........ 315/312; 315/185 R; 315/192; 315/246; 315/272

(58) Field of Classification Search
None
See application file for complete search history.

(56) References Cited

U.S. PATENT DOCUMENTS

| | | | |
|---|---|---|---|
| 2005/0162101 A1* | 7/2005 | Leong et al. | 315/291 |
| 2007/0223225 A1 | 9/2007 | Eiich et al. | |
| 2011/0057572 A1* | 3/2011 | Kit et al. | 315/185 R |
| 2012/0062114 A1* | 3/2012 | Chang | 315/51 |

FOREIGN PATENT DOCUMENTS

| | | |
|---|---|---|
| JP | 11-162234 A | 6/1999 |
| JP | 2004-192833 A | 7/2004 |
| JP | 2005-294847 A | 10/2005 |
| JP | 3117281 U | 11/2005 |
| JP | 2007-184547 A | 7/2007 |
| JP | 3143194 U | 6/2008 |
| JP | 2009-200431 A | 9/2009 |
| JP | 2009-206383 A | 9/2009 |
| JP | 2010-003683 A | 1/2010 |
| JP | 2010-511971 A | 4/2010 |
| JP | 2010-153345 A | 7/2010 |
| JP | 3162698 U | 8/2010 |
| JP | 2010-211289 A | 9/2010 |
| KR | 10-2010-0045342 A | 5/2010 |
| KR | 10-2010-0068006 A | 6/2010 |
| WO | WO 2007/035203 A2 | 3/2007 |
| WO | WO 2008/136458 A1 | 11/2008 |
| WO | WO 2009/035203 A1 | 3/2009 |
| WO | WO 2010/069983 A1 | 6/2010 |
| WO | WO 2010/124413 A1 | 11/2010 |

* cited by examiner

*Primary Examiner* — Anh Tran
(74) *Attorney, Agent, or Firm* — Rabin & Berdo, P.C.

(57) ABSTRACT

A light emitting diode lamp includes: two first pins which are provided at one side thereof; two second pins which are provided at the other side thereof; a light emitting diode (LED) module which is disposed between the two first pins and the two second pins; a circuit connecting at least two of the two first pins and the two second pins to the LED module; and a protection circuit including a fuse which is disposed at a front end of the LED module to protect the LED module in case of generation of high voltage. The circuit is configured to have a direction from a front end of the LED module to the other end thereof as a forward direction.

12 Claims, 9 Drawing Sheets

LED LAMP

CROSS-REFERENCE TO RELATED APPLICATION

This application claims priority to and the benefit of Korean Patent Application No. 10-2010-0113134 filed in the Korean Intellectual Property Office on Nov. 15, 2010, the entire contents of which are incorporated herein by reference.

FIELD OF THE INVENTION

The present invention relates to an LED lamp which has an improved safety.

BACKGROUND ART

Generally, a fluorescent lamp is illuminated by being applied with an alternating current of about 100 to 1,500V. On the other hand, a tubular light emitting diode (LED) lamp is developed to substitute the conventional fluorescent lamp, and an alternating is current is input to a switching mode power supply (SMPS) to be converted to a direct current, and then the converted direct current is applied to the tubular LED, and thereby the light emitting diode emits light using the direct current.

As such, since the LED is a semiconductor using a direct current, and life span of the LED may be decreased or malfunction may occur when an alternating current which is generally applied to a fluorescent lamp is applied thereto.

For example, if a base which is similar to a base of a fluorescent lamp is used to the LED lamp, a general user may confuse the LED lamp with the fluorescent lamp and thus connects the LED lamp to a socket for a fluorescent lamp, and this may cause problems. In order to solve this problem, a method of forming a base for the LED lamp to be differentiable from a conventional base of a fluorescent lamp has been introduced.

That is, if an LED lamp is used to a conventional ballast stabilizer of a fluorescent lamp, an LED lamp is supplied with an alternating current of 100 to 1,500V from the ballast stabilizer, so life span of an LED lamp which is configured to operate under low voltage may be reduced or malfunction may occur, or may be damaged or may cause fire. As such, with the use of an LED lamp, safety measures are required.

Technical Problem

The prevent invention has been made in an effort to provide a light emitting diode lamp having a circuit which prevents decrease of life span, malfunction, safety accident of a light emitting diode lamp which uses a direct current even when a light emitting diode lamp is connected to a conventional socket of a fluorescent lamp by mistake or confusion.

Technical Solution

An exemplary light emitting diode lamp according to an embodiment of the present invention includes: two first pins which are provided at one side thereof; two second pins which are provided at the other side thereof; a light emitting diode (LED) module which is disposed between the two first pins and the two second pins; a circuit connecting at least two of the two first pins and the two second pins to the LED module; and a protection circuit including a fuse which is disposed at a front end of the LED module to protect the LED module in case of generation of high voltage. The circuit is configured to have a direction from a front end of the LED module to the other end thereof as a forward direction.

One of the two first pins and one of the two second pins may be respectively connected to the front end of the LED module.

The fuse may be respectively disposed at one of the two first pins and one of the two second pins.

The protection circuit may further include: rectifier diodes which are respectively connected to one of the two first pins and one of the two second pins in a forward direction; and transient voltage suppression (TVS) diodes which respectively interconnect the two first pins and the two second pins.

The protection circuit may further include: rectifier diodes which are respectively connected to one of the two first pins and one of the two second pins in a forward direction; transient voltage suppression (TVS) diodes which respectively interconnect the two first pins and the two second pins; and bridge diodes which respectively interconnect the two first pins and the two second pins in a state of non-polarity.

The fuse may be respectively disposed one the two first pins and one of the two second pins.

The protection circuit may further include: a rectifier diode which is connected to one of the two first pins in a forward direction; and a transient voltage suppression TVS) diode which interconnects the two first pins. The two second pins may be grounded to be electrically insulated.

The fuse may be provided at a front side of the rectifier diode.

The protection circuit may further include a bridge diode which interconnects the two first pins in a state of non-polarity.

The protection circuit may include: a rectifier diode which is connected to one of the two first pins in a forward direction; and a transient voltage suppression (TVS) diode which interconnects the two first pins. One of the two first pins may be connected to a front end of the LED module and the other one of the two first pins may be grounded to be electrically insulated.

The protection circuit may include: a rectifier diode which is connected to one of the two first pins in a forward direction; a bridge diode which interconnects the two first pins in a state of non-polarity; and a transient voltage suppression (TVS) diode which interconnects the two first pins. One of the two first pins may be connected to a front end of the LED module via the bridge diode and one of the two second pins may be grounded to be electrically insulated.

The fuse may be provided at a front side of the rectifier diode.

An exemplary light emitting diode lamp according to another embodiment of the present invention includes: two first pins which are provided at one side thereof; two second pins which are provided at the other side thereof; a light emitting diode (LED) module which is disposed between the two first pins and the two second pins; a circuit connecting at least two of the two first pins and the two second pins to the LED module; and a protection circuit including bridge diodes which respectively interconnect the two first pins and the two second pins in a state of non-polarity. The circuit is configured to have a direction from a front end of the LED module to the other end thereof as a forward direction.

The protection circuit may further include a fuse which is inserted into a front end of the LED module to protect the LED module in case of generation of high voltage.

The fuses may be respectively disposed at one of the two first pins and one of the two second pins.

The fuse may be provided at a front side of the bridge diode.

The protection circuit may further include fuses which are respectively disposed at the two first pins and the two second pins to protect the LED module in case of generation of high voltage.

An exemplary light emitting diode lamp according to another embodiment of the present invention includes: two first pins which are provided at one side thereof; two second pins which are provided at the other side thereof; a light emitting diode (LED) module which is disposed between the two first pins and the two second pins; a circuit connecting at least two of the two first pins and the two second pins to the LED module; and a protection circuit including a bridge diode which interconnects the two first pins in a state of non-polarity and a fuse which is inserted into a front end of the LED module to protect the LED module in case of generation of high voltage. One of the two first pins is connected to a front end of the LED module via the bridge diode, and the circuit is configured to have a direction from a front end of the LED module to the other end thereof as a forward direction.

The two second pins may be grounded to be electrically insulated.

The protection circuit may further include a transient voltage suppression (TVS) diode which interconnects the two first pins.

The fuse may be disposed at a front side of the bridge diode.

An exemplary light emitting diode lamp according to another embodiment of the present invention includes: two first pins which are provided at one side thereof; two second pins which are provided at the other side thereof; a light emitting diode (LED) module which is disposed between the two first pins and the two second pins; a circuit connecting at least two of the two first pins and the two second pins to the LED module; and a protection circuit including a bridge diode which interconnects the two first pins in a state of non-polarity. One of the two first pins is connected to a front end of the LED module via the bridge diode, the two second pins are grounded to be electrically insulated, and the circuit is configured to have a direction from a front end of the LED module to the other end thereof as a forward direction.

Technical Solution

According to the present invention, since a circuit is provided with a protection circuit by a fuse, a rectifier diode, a TVS diode, a bridge diode, or the combination thereof, even when a user connects a LED lamp according to an embodiment of the present invention to a socket of a conventional fluorescent lamp by mistake or confusion so that abnormal or surge voltage is applied to the LED lamp, problems such as decrease of life span, malfunction, or safety accident of the light emitting diode lamp which may be caused by applying of unsuitable current to the LED lamp can be prevented.

Further, since the number and the shape of the pins of the LED lamp are the same with those of a conventional fluorescent lamp, a socket of a conventional fluorescent lamp can be used for the LED lamp without modification, and accordingly cost and time for replacing the fluorescent lamp with the LED lamp can be substantially reduced.

BRIEF DESCRIPTIONS OF DRAWINGS

DETAILED DESCRIPTION OF THE EMBODIMENTS

Embodiments of the present invention will be explained in detail with reference to the accompanied drawings.

Referring to FIG. 1 to FIG. 15, a light emitting diode (LED) lamp according to embodiments of the present invention includes two first pins 61 and 62 which are provided at one end, two second pins 63 and 64 which are provided at the other end, an LED module 1 which is provided between the first pins 61 and 62 and the second pins 63 and 64, and a circuit 7 which connects at least two of the two first pins 61 and 62 and the two second pins 63 and 64 with the LED module 1.

At this time, connecting at least two of the two first pins 61 and 62 and the two second pins 63 and 64 with the LED module 1 by the circuit 7 may mean that at least one of a positive pole pin among the four pins 61, 62, 63, and 64 is provided and at least one of a negative pole pin is provided and they are connected respectively to a front end and a rear end of the LED module 1 via the circuit 7.

Figure 1:
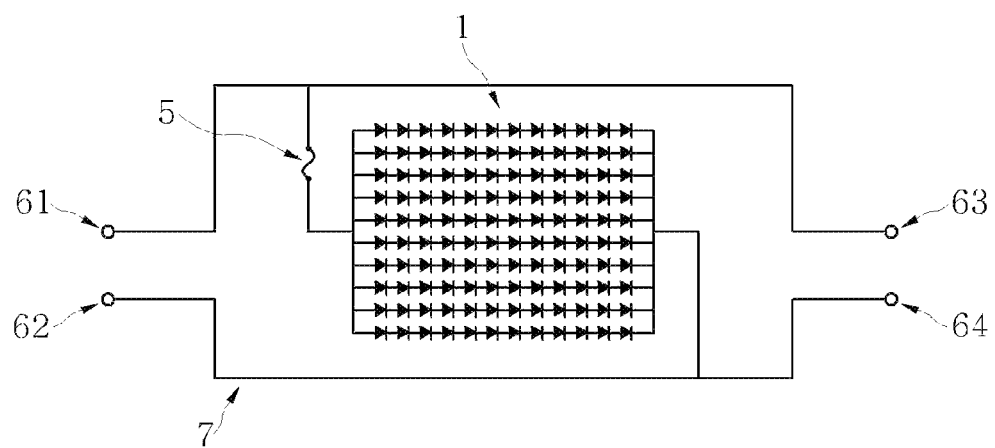
FIG. 1 is a circuit diagram of an LED lamp according to a first embodiment of the present invention.

That is, in FIG. 1, the two pins 61 and 63 are the positive pole to be connected to a front end of the LED module 1 via the circuit 7, and the other two pins 62 and 64 are the negative pole to be connected to a rear end of the LED module 1 via the circuit 7, so the circuit 7 may connect at least two (i.e., four) among the four pins 61, 62, 63, and 64 with the LED module 1. In addition, in FIG. 6, the one pin 61 is the positive pole and the other one pin 62 is the negative pole, and accordingly the circuit 7 may connect at least two (two) among the four pins 61, 62, 63, and 64 with the LED module 1. In addition, in FIG. 8, the one pin 61 is the positive pole and the other two pins 63 and 64 are the negative pole, and accordingly the circuit 7 may connected at least two (three) among the four pins 61, 62, 63, and 64 with the LED module 1.

Further, the pin which is not connected to the LED module 1 via the circuit 7, i.e, the pin which is grounded, may be provided in a state of being electrically insulated, or can be omitted. But, in order to be stably connected to a conventional socket for a fluorescent lamp, it is preferable that at least one pin is provided at each end of the LED module 1.

The first to seventh embodiments of the present invention will be explained. Explanations for the repeated parts will be made briefly or omitted.

First, the first embodiment will be explained.

FIG. 1 is a circuit diagram of an LED lamp according to a first embodiment of the present invention.

Referring to FIG. 1, the LED lamp according to the first embodiment of the present invention includes a protection circuit having a fuse 5 which is inserted at a front end of the LED module 1 to protect the LED module 1 in case of generation of high voltage. At this time, the circuit 7 is configured to have a direction from a front end of the LED module 1 to the other end as a forward direction.

At this time, although reference numeral is not allocated for a protection circuit in the drawing, the protection circuit may be called to generally designate parts for protecting the LED module 1 from overvoltage or the like. That is, the protection circuit may include the fuse 5, a rectifier diode 2, a transient voltage suppression (TVS) diode 3, a bridge diode 4, etc. Referring to FIG. 1, in a first embodiment, the protection circuit includes the fuse 5.

One of the first pins 61 and 62 and one of the two second pins 63 and 64 may be connected to a front end of the LED module 1.

As an example, referring to FIG. 1, the two pins which are designated by reference numerals 61 and 63 may be connected to the front end of the LED module 1. Accordingly, the other two pins which are designated by reference numerals 62 and 64 may be connected to the rear end of the LED module 1.

Subsequently, the second embodiment of the present invention will be explained.

Figure 2:
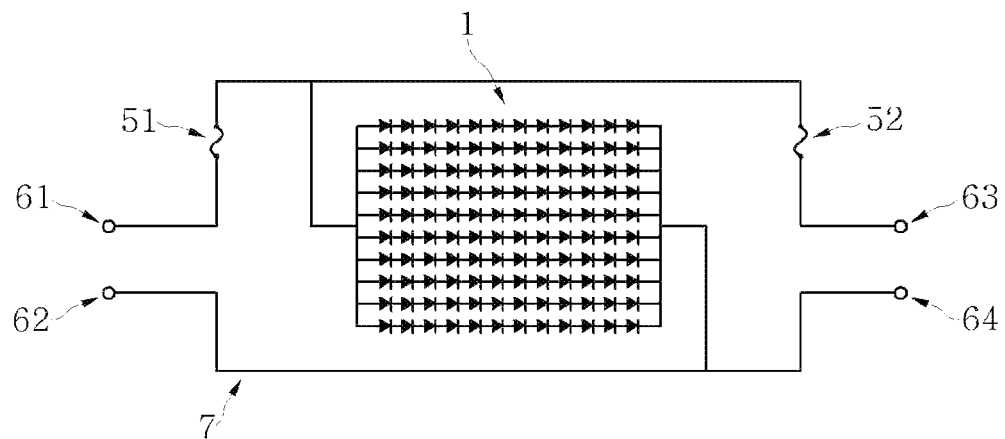
FIG. 2 is a circuit diagram of an LED lamp according to a second embodiment of the present invention.

FIG. 2 is a circuit diagram of an LED lamp according to a second embodiment of the present invention.

Referring to FIG. 2, the LED lamp according to the second embodiment of the present invention includes a protection circuit having a fuse which is inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 and one of the two second pins 63 and 64 may be connected to a front end of the LED module 1.

Further, in the second embodiment, the fuse 51 and 52 may be respectively disposed at one of the first pins 61 and 62 and one of the second pins 63 and 64. In other exemplary embodiment, the fuse 51 and 52 may be provided more than two. For example, the fuses may be disposed at all pins 61, 62, 63, and 64 respectively.

As an example, referring to FIG. 2, the fuse 51 may be disposed at the pin 61, and the other fuse 52 may be disposed at the pin 63. At this time, the deposition of the fuses 51 and 52 at the pins 61 and 63 may mean that the fuses 51 and 52 are inserted into the circuit 7 to which the pins 61 and 63 and the LED module 1 are connected.

Subsequently, the third embodiment of the present invention will be explained.

Figure 3:
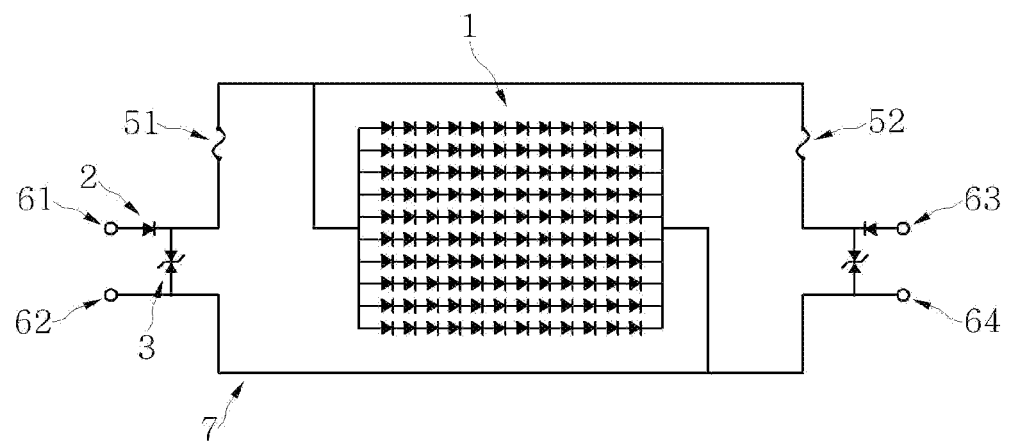
FIG. 3 is a circuit diagram of an LED lamp according to a third embodiment of the present invention.

FIG. 3 is a circuit diagram of an LED lamp according to a third embodiment of the present invention.

Referring to FIG. 3, the LED lamp according to the third embodiment of the present invention includes a protection circuit having the fuses 51 and 52 which are inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 and one of the two second pins 63 and 64 may be connected to a front end of the LED module 1. Furthermore, the fuses 51 and 52 may be respectively disposed at one of the two first pins 61 and 62 and one of the two second pins 63 and 64.

The protection circuit may further include the rectifier diodes 2 which are respectively disposed at one of the two first pins 61 and 62 and one of the two second pins 63 and 64 in a forward direction, and the TVS diodes 3 which interconnect respectively the two first pins 61 and 62 and the two second pins 63 and 64. As an example, referring to FIG. 3, the rectifier diode 2 is connected to the pin 61 in a forward direction, and the rectifier diode 2 is also connected to the pin 63 in a forward direction.

At this time, if a forward bias is applied to the diode, forward direction current flows, and if a reverse bias is applied thereto, a current does not flow. Using these diodes, it can be configured that a current flow. Function that a current is allowed to flow only in one direction even when a voltage alternately change is referred to as a rectification, and a diode which performs this function may be referred to as a rectifier diode. Accordingly, the rectifier diode may be used to convert an alternating current to a direct current. Since a conventional ballast stabilizer for a fluorescent lamp outputs an alternating current, the rectifier diode 2 may prevent an alternating current from being applied to the LED module so as to protect the same.

The TVS diode 3 is a high voltage protection circuit. As an example, the TVS diode 3 may be used to protect the circuit 7 from an electrical transient state caused by instantaneous surge voltage or transient voltage. Since a conventional ballast stabilizer of a fluorescent lamp outputs an alternating current, in case that the LED lamp according to an embodiment of the present invention is connected to a conventional ballast stabilizer of a fluorescent lamp, abnormal voltage or surge voltage may be applied, and in such a case the TVS diode may protect the LED module and the circuit 7.

Subsequently, the fourth embodiment of the present invention will be explained.

Figure 4:
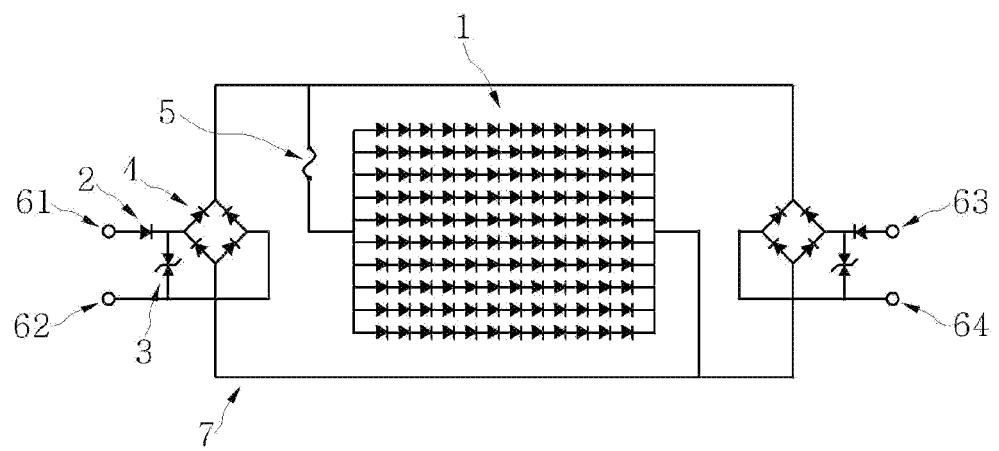
FIG. 4 is a circuit diagram of an LED lamp according to a fourth embodiment of the present invention.

FIG. 4 is a circuit diagram of an LED lamp according to a fourth embodiment of the present invention.

Referring to FIG. 4, the LED lamp according to the fourth embodiment of the present invention includes a protection circuit having the fuse 5 which is inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 and one of the two second pins 63 and 64 may be connected to a front end of the LED module 1.

The protection circuit may further include the rectifier diodes 2 which are respectively disposed at one of the two first pins 61 and 62 and one of the two second pins 63 and 64 in a forward direction, the TVS diodes 3 which interconnect respectively the two first pins 61 and 62 and the two second pins 63 and 64, and the bridge diodes 4 which respectively interconnect the two first pins 61 and 62 and the two second pins 63 and 64 in a non-polarity state. As an example, referring to FIG. 4, the rectifier diode 2 and the TVS diode 3 are disposed and connected in a similar way with the third embodiment.

At this time, the bridge diode 4 may be formed by assembling four diodes as shown in FIG. 4 so as to execute full-wave rectification. One diode may only execute half-wave rectification which uses only one of a plus side and a minus side of voltage in which plus and minus alternately change, but full-wave rectification can be possible through the bridge diode 4. Since a conventional ballast stabilizer for a fluorescent lamp outputs an alternating current, the rectifier diode 2 may prevent an alternating current from being applied to the LED module so as to protect the same.

Subsequently, the fifth embodiment of the present invention will be explained.

Figure 5:
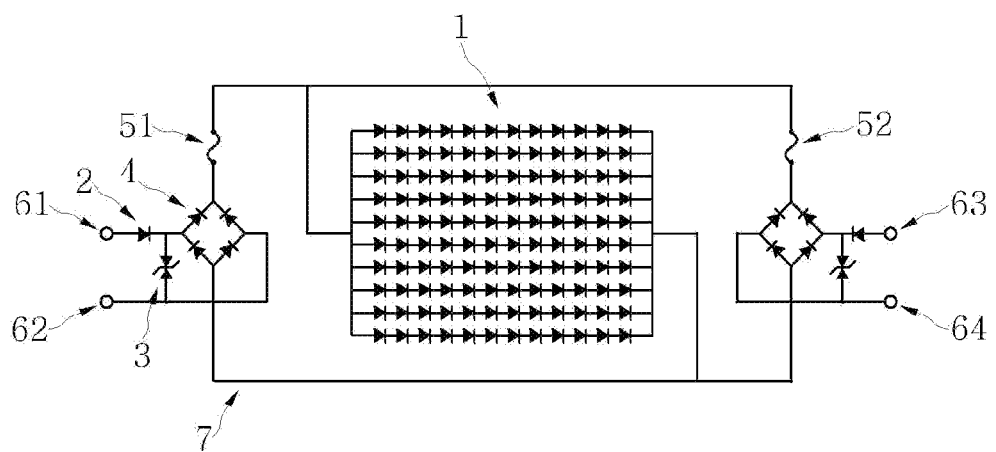
FIG. 5 is a circuit diagram of an LED lamp according to a fifth embodiment of the present invention.

FIG. 5 is a circuit diagram of an LED lamp according to a fifth embodiment of the present invention.

Referring to FIG. 5, the LED lamp according to the fifth embodiment of the present invention includes a protection circuit having the fuse which is inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 and one of the two second pins 63 and 64 may be connected to a front end of the LED module 1. The protection circuit may further include the rectifier diodes 2 which are respectively disposed at one of the two first pins 61 and 62 and one of the two second pins 63 and 64 in a forward direction, the TVS diodes 3 which interconnect respectively the two first pins 61 and 62 and the two second pins 63 and 64, and the bridge diodes 4 which respectively interconnect the two first pins 61 and 62 and the two second pins 63 and 64 in a non-polarity state. As an example, referring to FIG. 4, the rectifier diode 2 and the TVS diode 3 are disposed and connected in a similar way with the third embodiment.

In this embodiment, the fuses 51 and 52 are respectively at one of the two first pins 61 and 62 and one of the two second pins 63 and 64.

As an example, referring to FIG. 5, one fuse 51 is disposed at the pin 61, ad the other fuse 52 is disposed at the pin 63. At this time, the disposition of the fuses 51 and 52 at the pins 61 and 63 may mean that the fuses 51 and 52 are inserted into the circuit to which the pins 61 and 63 and the LED module 1 are connected. In FIG. 5, the fuse 51 is inserted into the part of the circuit 7 at the rear of the bridge diode 4 which is connected to the pin 61, and the fuse 52 is inserted into the part of the circuit 7 at the rear of the bridge diode 4 which is connected to the pin 63.

Subsequently, the sixth embodiment of the present invention will be explained.

Figure 6:
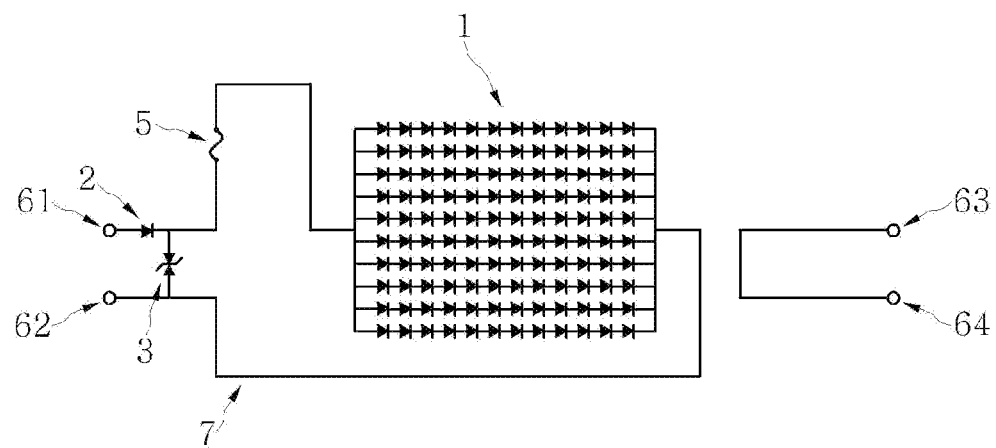
FIG. 6 is a circuit diagram of an LED lamp according to a sixth embodiment of the present invention.

FIG. 6 is a circuit diagram of an LED lamp according to a sixth embodiment of the present invention.

Referring to FIG. 6, the LED lamp according to the sixth embodiment of the present invention includes a protection circuit having the fuse 5 which is inserted at a front end of the LED module 1 to protect the LED module 1 in case of generation of high voltage. At this time, the circuit 7 is configured to have a direction from a front end of the LED module 1 to the other end as a forward direction.

In addition, as shown in FIG. 6, the two second pins 63 and 64 are grounded to be electrically insulated. Accordingly, one of the two first pins 61 and 62 may be a positive pole and the other one thereof may be a negative pole.

Meanwhile, referring to FIG. 6, the protection circuit may further include the rectifier diode 2 which is respectively disposed at one of the two first pins 61 and 62 in a forward direction, and the TVS diode 3 which interconnects the two first pins 61 and 62. As an example, referring to FIG. 6, the rectifier diode 2 is connected to the pin 61 in a forward direction. The rectifier diode 2 and the TVS diode 3 are disposed and connected in a similar way with the third embodiment, but in the sixth embodiment the two second pins 63 and 64 are grounded, so the rectifier diode 2 and the TVS diode 3 are provided only to the first pins 61 and 62.

Meanwhile, different from FIG. 6, the fuse 5 may be provided at a front end of the rectifier diode 2. As an example, the fuse 5 may be disposed between the pin 61 and the rectifier diode 2 in FIG. 6.

Subsequently, the seventh embodiment of the present invention will be explained.

Figure 7:
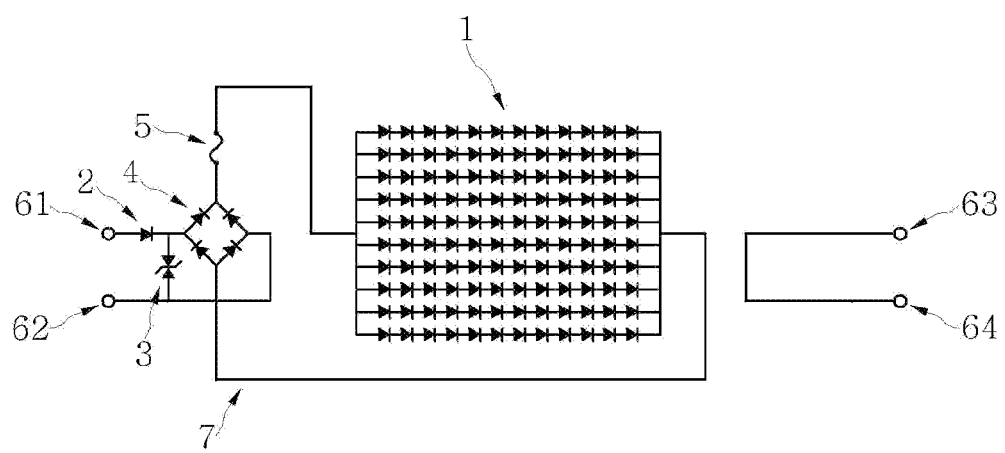
FIG. 7 is a circuit diagram of an LED lamp according to a seventh embodiment of the present invention.

FIG. 7 is a circuit diagram of an LED lamp according to a seventh embodiment of the present invention.

Referring to FIG. 7, the LED lamp according to the seventh embodiment of the present invention includes a protection circuit having the fuse 5 which is inserted at a front end of the LED module 1 to protect the LED module 1 in case of generation of high voltage. At this time, the circuit 7 is configured to have a direction from a front end of the LED module 1 to the other end as a forward direction. In addition, the two second pins 63 and 64 are grounded to be electrically insulated. The protection circuit may further include the rectifier diode 2 which is disposed at one of the two first pins 61 and 62 in a forward direction, and the TVS diode 3 which interconnects the two first pins 61 and 62.

In addition, referring to FIG. 7, the protection circuit may further include the bridge diode 4 which interconnects the two first pins 61 and 62 in a non-polarity state.

Subsequently, the eighth embodiment of the present invention will be explained.

Figure 8:
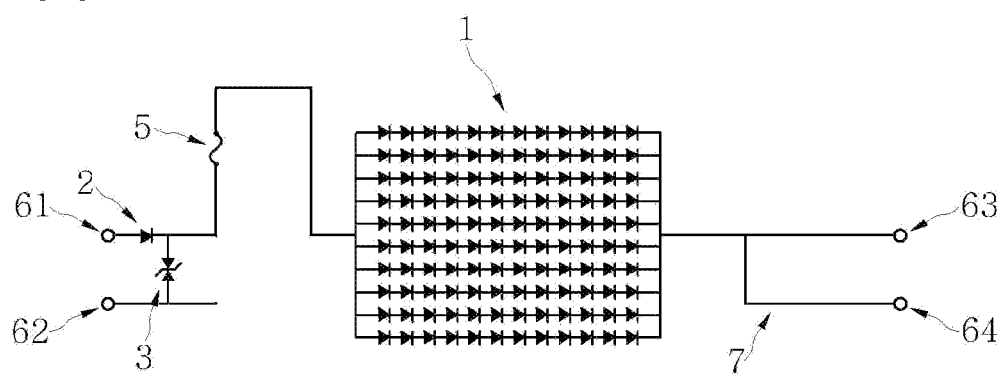
FIG. 8 is a circuit diagram of an LED lamp according to an eighth embodiment of the present invention.

FIG. 8 is a circuit diagram of an LED lamp according to an eighth embodiment of the present invention.

Referring to FIG. 8, the LED lamp according to the eighth embodiment of the present invention includes a protection circuit having the fuse 5 which is inserted at a front end of the LED module 1 to protect the LED module 1 in case of generation of high voltage. At this time, the circuit 7 is configured to have a direction from a front end of the LED module 1 to the other end as a forward direction.

As shown in FIG. 8, one of the two first pins 61 and 62 may be connected to a front end of the LED module 1, and the other one of the two first pins 61 and 62 is grounded to be electrically insulated. Accordingly, one of the two first pins may be a positive pole, and the two second pins 63 and 64 may be a negative pole.

Referring to FIG. 8, the protection circuit may further include the rectifier diode 2 which is disposed at one of the two first pins 61 and 62 in a forward direction, and the TVS diode 3 which interconnects the two first pins 61 and 62. As an example, referring to FIG. 6, the rectifier diode 2 may be connected to the pin 61 in a forward direction.

The rectifier diode 2 and the TVS diode 3 are disposed and connected in a similar way with the sixth embodiment shown in FIG. 6, but in this embodiment, the two second pins 63 and 64 are not grounded, but one of the first pins 61 and 62 is grounded, and accordingly polarities of the respective pins 61, 62, 63, 64 become different from those of the sixth embodiment.

Subsequently, the ninth embodiment of the present invention will be explained.

Figure 9:
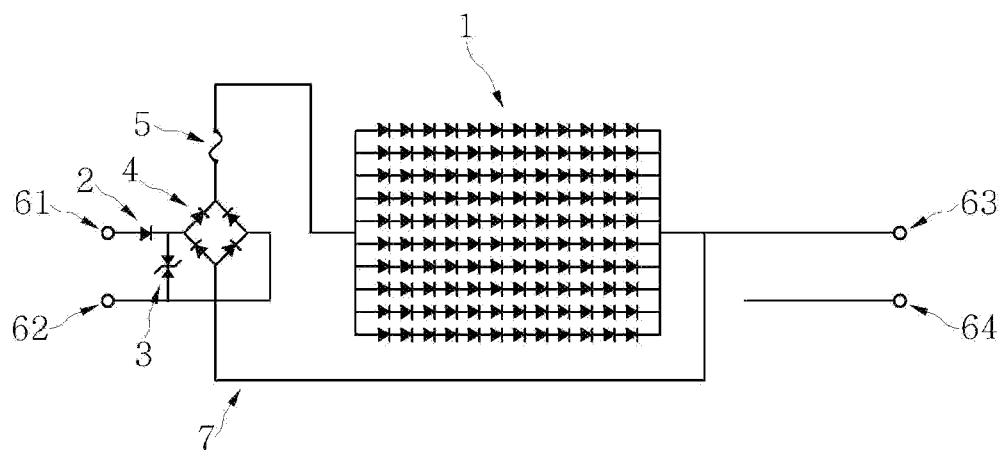
FIG. 9 is a circuit diagram of an LED lamp according to a ninth embodiment of the present invention.

FIG. 9 is a circuit diagram of an LED lamp according to a ninth embodiment of is the present invention.

Referring to FIG. 9, the LED lamp according to the ninth embodiment of the present invention includes a protection circuit having the fuse 5 which is inserted at a front end of the LED module 1 to protect the LED module 1 in case of generation of high voltage. At this time, the circuit 7 is configured to have a direction from a front end of the LED module 1 to the other end as a forward direction.

Referring to FIG. 9, the protection circuit may further include the rectifier diode 2 which is disposed at one of the two first pins 61 and 62 in a forward direction, the TVS diode 3 which interconnects the two first pins 61 and 62, and the bridge diode 4 which interconnects the two first pins 61 and 62 in a state of non-polarity. As an example, referring to FIG. 9, the rectifier diode 2 is connected to the pin 61 in a forward direction.

Further, the bridge diode 4 may be disposed at a rear side of the TVS diode 3 as shown in FIG. 9.

In addition, referring to FIG. 9, one of the two first pins 61 and 62 may be connected to a front end of the LED module 1. One of the two second pins 63 and 64 is grounded to be electrically insulated. As an example, the pin 64 may be grounded, and accordingly the pin 63 may be a negative pole.

The rectifier diode 2 and the TVS diode 3 are disposed and connected in a similar way with the eighth embodiment shown in FIG. 8, but in this embodiment, the bridge diode 4 is further provided as the protection circuit, and one of the two first pins 61 and 62 is not grounded, but one the two second pins 63 and 64 is grounded, and accordingly polarities of the respective pins 61, 62, 63, 64 become partially different from those of the sixth embodiment.

Further, different from FIG. 9, the fuse may be provided at a front side of the rectifier diode 2. As an example, the fuse 5 may be disposed between the pin 61 and the rectifier diode 2 in FIG. 9.

Subsequently, the tenth embodiment of the present invention will be explained.

Figure 10:
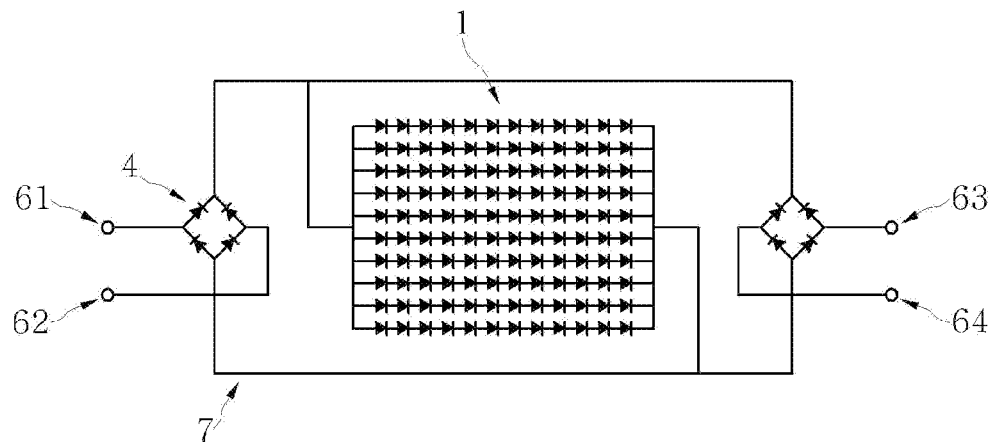
FIG. 10 is a circuit diagram of an LED lamp according to a tenth embodiment of the present invention.

FIG. 10 is a circuit diagram of an LED lamp according to a tenth embodiment of the present invention.

Referring to FIG. 10, the LED lamp according to the tenth embodiment of the present invention includes a protection circuit having the bridge diodes 4 which respectively interconnect the two first pins 61 and 62 and the two second pins 63 and 64 in a state of non-polarity. At this time, the circuit 7 is configured to have a direction from a front end of the LED module 1 to the other end as a forward direction.

In addition, referring to FIG. 10, one of the two first pins 61 and 62 and one of the two second pins 63 and 64 are respectively connected to a front end of the bridge diodes 4.

Subsequently, the eleventh embodiment of the present invention will be explained.

Figure 11:
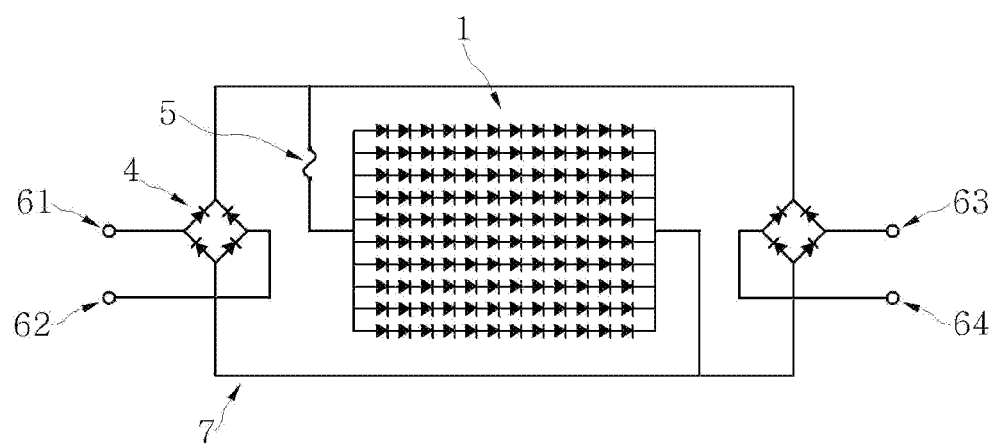
FIG. 11 is a circuit diagram of an LED lamp according to an eleventh embodiment of the present invention.

FIG. 11 is a circuit diagram of an LED lamp according to an eleventh embodiment of the present invention.

Referring to FIG. 11, the LED lamp according to the eleventh embodiment of the present invention includes a protection circuit having the bridge diodes 4 which respectively interconnect the two first pins 61 and 62 and the two second pins 63 and 64 in a state of non-polarity. At this time, the circuit 7 is configured to have a direction from a front end of the LED module 1 to the other end as a forward direction. In addition, one of the two first pins 61 and 62 and one of the two second pins 63 and 64 are respectively connected to a front end of the bridge diodes 4.

Referring to FIG. 11, the protection circuit may further include the fuse 5 which is inserted into a front end of the LED module 1 to protect the LED module 1 in case of generation of high voltage. Although in FIG. 11 one fuse 5 is inserted into a front end of the LED module 1, the number of the fuse 5 is not limited to one. For example, the fuses 5 may be respectively inserted into the pin 61 and the pin 63.

Further, different from FIG. 11, the fuse 5 may be disposed at a front side of the bridge diode 4. As an example, the fuse 5 may be disposed between the pin 61 and the bridge diode 4 in FIG. 11, between the pin 63 and the bridge diode 4, or between the pin 61 and the bridge diode 4 and between the pin 63 and the bridge diode 4.

Subsequently, the twelfth embodiment of the present invention will be explained.

Figure 12:
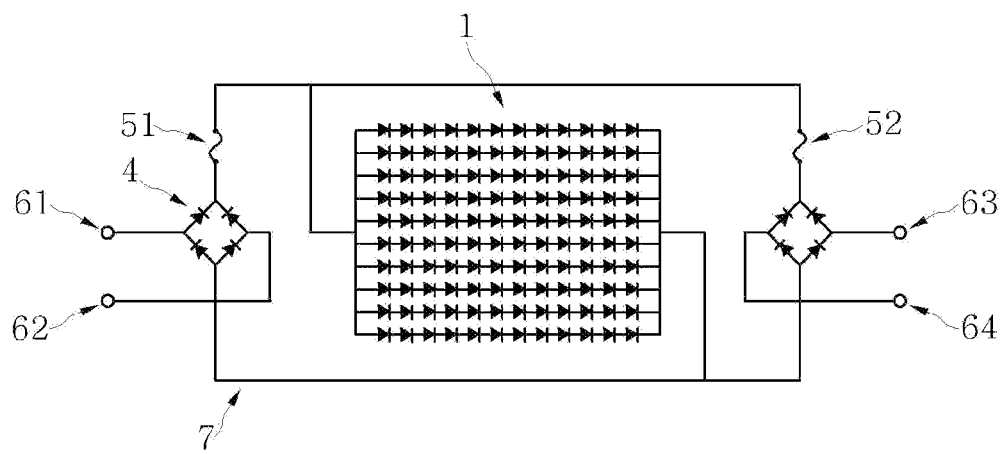
FIG. 12 is a circuit diagram of an LED lamp according to a twelfth embodiment of the present invention.

FIG. 12 is a circuit diagram of an LED lamp according to a twelfth embodiment of the present invention.

Referring to FIG. 12, the LED lamp according to the twelfth embodiment of the present invention includes a protection circuit having the bridge diodes 4 which respectively interconnect the two first pins 61 and 62 and the two second pins 63 and 64 in a state of non-polarity. At this time, the circuit 7 is configured to have a direction from a front end of the LED module 1 to the other end as a forward direction. In addition, one of the two first pins 61 and 62 and one of the two second pins 63 and 64 are respectively connected to a front end of the bridge diodes 4. The protection circuit may further include the fuse which is inserted into a front end of the LED module 1 to protect the LED module 1 in case of generation of high voltage.

In this embodiment, as shown in FIG. 12, the fuses 51 and 52 may be respectively disposed at one of the two first pins 61 and 62 and one of the two second pins 63 and 64.

Meanwhile, different from FIG. 12, the fuses 51 and 52 may be at a front side of the bridge diode 4. As an example, the fuse 51 may be disposed between the pin 61 and the bridge diode 4, and the other fuse 52 may be disposed between the pin 63 and the bridge diode 4.

Subsequently, the thirteenth embodiment of the present invention will be explained.

Figure 13:
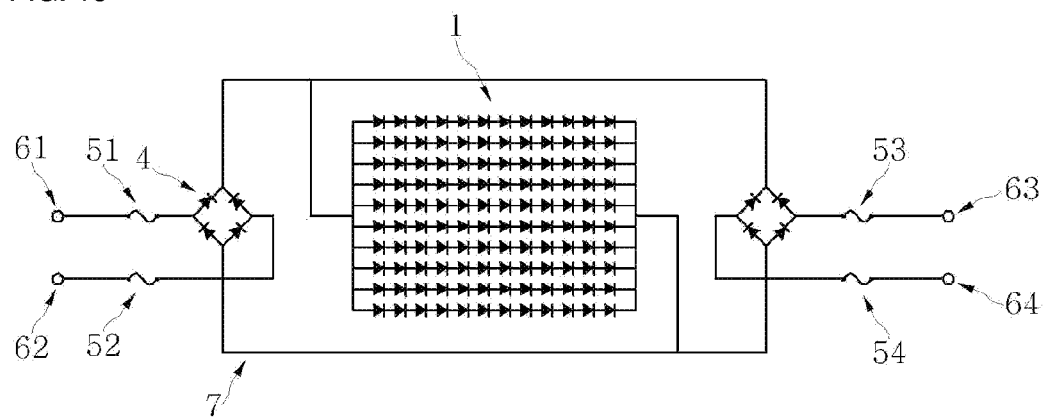
FIG. 13 is a circuit diagram of an LED lamp according to a thirteenth embodiment of the present invention.

FIG. 13 is a circuit diagram of an LED lamp according to a thirteenth embodiment of the present invention.

Referring to FIG. 13, the LED lamp according to the thirteenth embodiment of the present invention includes a protection circuit having the bridge diodes 4 which respectively interconnect the two first pins 61 and 62 and the two second pins 63 and 64 in a state of non-polarity. At this time, the circuit 7 is configured to have a direction from a front end of the LED module 1 to the other end as a forward direction. In addition, one of the two first pins 61 and 62 and one of the two second pins 63 and 64 are respectively connected to a front end of the bridge diodes 4.

Referring to FIG. 13, the protection circuit may further include the fuses 51, 52, 53, 54 which are respectively disposed at the pins 61, 62, 63, 64 to protect the LED module 1 in case of generation of high voltage.

Subsequently, the fourteenth embodiment of the present invention will be explained.

Figure 14:
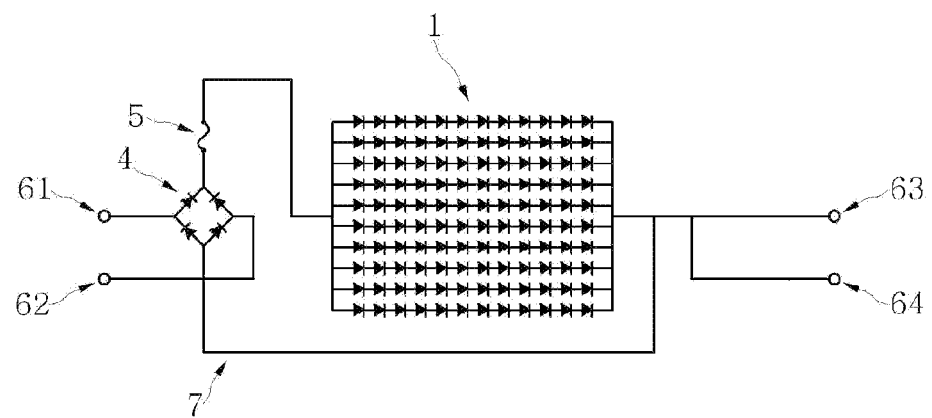
FIG. 14 is a circuit diagram of an LED lamp according to a fourteenth embodiment of the present invention.

FIG. 14 is a circuit diagram of an LED lamp according to a fourteenth embodiment of the present invention.

Referring to FIG. 14, the LED lamp according to the fourteenth embodiment of the present invention includes a protection circuit having the bridge diode 4 which interconnects the two first pins 61 and 62 in a state of non-polarity and the fuse 5 which is inserted at a front end of the LED module 1 to protect the LED module 1 in case of generation of high voltage. At this time, the circuit 7 is configured to have a direction from a front end of the LED module 1 to the other end as a forward direction.

In addition, referring to FIG. 14, one the two first pins 61 and 62 is connected via the bridge diode 4 to a front end of the LED module 1. As an example, the pins 63 and 64 may be a negative pole.

Meanwhile, different from FIG. 14, the fuse 5 may be provided at a front side of the bridge diode 4. As an example, the fuse 5 may be disposed between the pin 61 and the bridge diode 4 in FIG. 14.

Subsequently, the fifteenth embodiment of the present invention will be explained.

Figure 15:
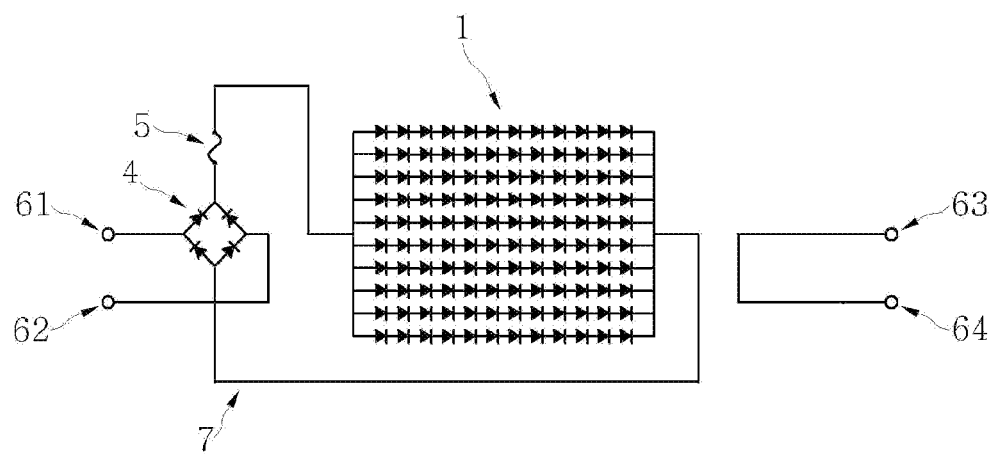
FIG. 15 is a circuit diagram of an LED lamp according to a fifteenth embodiment of the present invention.

FIG. 15 is a circuit diagram of an LED lamp according to a fifteenth embodiment of the present invention.

Referring to FIG. 15, the LED lamp according to the fifteenth embodiment of the present invention includes a protection circuit having the bridge diode 4 which interconnects the two first pins 61 and 62 in a state of non-polarity and the fuse 5 which is inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 is connected to a front end of the LED module 1 via the bridge diode 4.

In addition, referring to FIG. 15, the two second pins 63 and 64 may be grounded to be electrically insulated. Accordingly, the pin 61 may become a positive pole, and the pin 62 may become a negative pole.

Meanwhile, different from FIG. 15, the fuse 5 may be disposed at a front side of the bridge diode 4. As an example, the fuse 15 may be disposed between the pin 61 and the bridge diode 4 in FIG. 15.

Subsequently, the sixteenth embodiment of the present invention will be explained.

Figure 16:
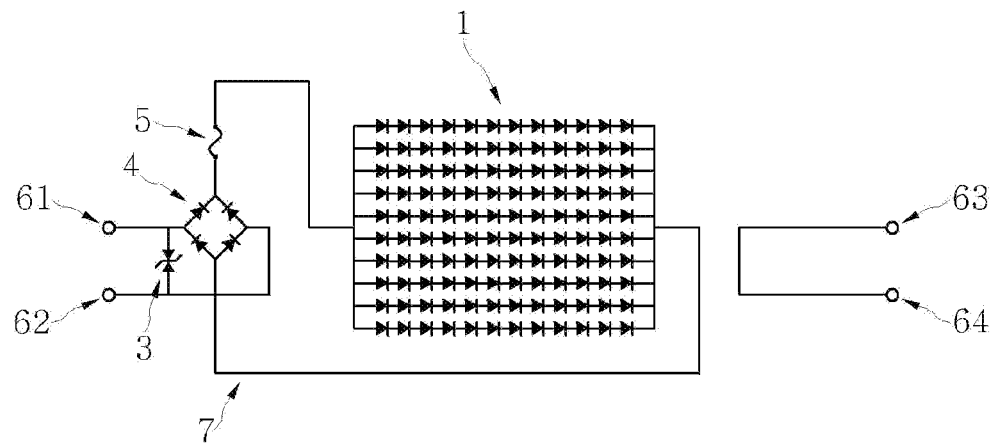
FIG. 16 is a circuit diagram of an LED lamp according to a sixteenth embodiment of the present invention.

FIG. 16 is a circuit diagram of an LED lamp according to a sixteenth embodiment of the present invention.

Referring to FIG. 16, the LED lamp according to the sixteenth embodiment of the present invention includes a protection circuit having the bridge diode 4 which interconnects the two first pins 61 and 62 in a state of non-polarity and the fuse 5 which is inserted at a front end of the LED module 1 to protect the LED module 1 in case of generation of high voltage. At this time, the circuit 7 is configured to have a direction from a front end of the LED module 1 to the other end as a forward direction. In addition, one of the two first pins 61 and 62 is connected to a front end of the LED module 1 via the bridge diode 4. In addition, the two second pins 63 and 64 are grounded to be electrically insulated.

In addition, the protection circuit may further include the TVS diode 3 which interconnects the two first pins 61 and 62.

Meanwhile, different from FIG. 16, the fuse 5 may be disposed at a front side of the bridge diode 4. As an example, the fuse 5 may be disposed between the pin 61 and the bridge diode 4 in FIG. 16.

Subsequently, the seventeenth embodiment of the present invention will be explained.

Figure 17:
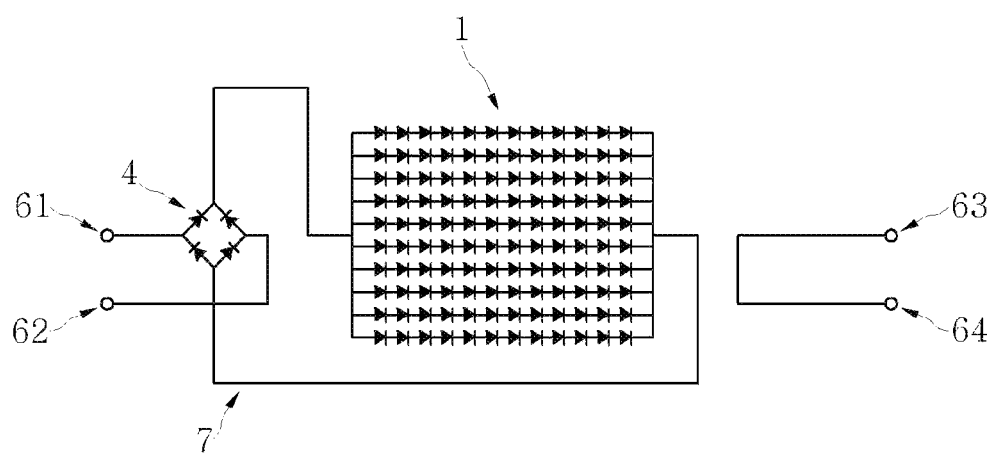
FIG. 17 is a circuit diagram of an LED lamp according to a seventeenth embodiment of the present invention.

FIG. 17 is a circuit diagram of an LED lamp according to a seventeenth embodiment of the present invention.

Referring to FIG. 17, the LED lamp according to the seventeenth embodiment of the present invention includes a protection circuit having the bridge diode 4 which interconnects the two first pins 61 and 62 in a state of non-polarity. At this time, the circuit 7 is configured to have a direction from a front end of the LED module 1 to the other end as a forward direction.

In addition, referring to FIG. 17, one of the two first pins 61 and 62 is connected to a front end of the LED module 1 via the bridge diode 4. The two second pins 63 and 64 are grounded to be electrically insulated.

As described in the first to seventeenth embodiments, the protection circuit is provided in the circuit 7 of the LED lamp by the fuses 5, 51, 52, 53, 54, the rectifier diode 2, the TVS diode 3, the bridge diode 4, and the combination thereof, electric power is not applied to the LED lamp in case that it is connected to wiring with a switching mode power supply (SMPS) designed for the LED lamp using a direct current, and in case that abnormal high voltage is applied, the abnormal high voltage can be automatically blocked.

Accordingly, even in case that a user connects the LED lamp according to embodiments of the present invention to a conventional socket of a fluorescent lamp by mistake or confusion so that abnormal voltage or surge is applied to the LED lamp, problems such as decrease of life span, malfunction, or fire risk which are caused by applying unsuitable current to the LED lamp can be prevented.

In addition, since the number and the shape of the pins of the LED lamp are the same with those of a conventional fluorescent lamp, a socket of a conventional fluorescent lamp can be used for the LED lamp without modification, and accordingly cost and time for replacing the fluorescent lamp with the LED lamp can be substantially reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

[Description of reference numerals for main parts of drawings]

| | |
|---|---|
| 1: light emitting diode module | 2: rectifier diode |
| 3: TVS diode | 4: bridge diode |
| 5, 51, 52, 53, 54: fuse | 61, 62: first pin |
| 63, 64: second pin | 7: circuit |

What is claimed is:

1. A light emitting diode lamp, comprising:
   two first pins which are provided at one side thereof;
   two second pins which are provided at the other side thereof;
   a light emitting diode (LED) module which is disposed between the two first pins and the two second pins;
   a circuit connecting at least two pins of the two first pins and the two second pins to the LED module; and
   a protection circuit for protecting the LED module in case of generation of high voltage,
   wherein the two second pins are grounded to be electrically insulated from the LED module.

2. The light emitting diode lamp of claim 1, wherein one of the two first pins and one of the two second pins are respectively connected to a front end of the LED module.

3. The light emitting diode lamp of claim 2, wherein the protection circuit comprises a first fuse disposed at one of the two first pins and a second fuse disposed at one of the two second pins.

4. The light emitting diode lamp of claim 3, wherein the protection circuit further comprises:
   rectifier diodes which are respectively connected to one of the two first pins and one of the two second pins in a forward direction; and
   transient voltage suppression (TVS) diodes which respectively interconnect the two first pins and the two second pins.

5. The light emitting diode lamp of claim 2, wherein the protection circuit further comprises:
   at least one fuse disposed at the front end of the LED module;
   rectifier diodes which are respectively connected to one of the two first pins and one of the two second pins in a forward direction;

transient voltage suppression (TVS) diodes which respectively interconnect the two first pins and the two second pins; and bridge diodes which respectively interconnect the two first pins and the two second pins in a state of non-polarity.

6. The light emitting diode lamp of claim 5, wherein the at least one fuse includes a first fuse disposed at one of the two first pins and a second fuse disposed at one of the two second pins.

7. The light emitting diode lamp of claim 5, wherein the fuse is provided at a front side of the rectifier diode.

8. The light emitting diode lamp of claim 5, wherein the protection circuit further comprises a bridge diode which interconnects the two first pins in a state of non-polarity.

9. A light emitting diode lamp, comprising:
two first pins provided at one side thereof;
two second pins provided at the other side thereof;
a light emitting diode (LED) module disposed between the two first pins and the two second pins;
a circuit connecting at least two pins of the two first pins and the two second pins to the LED module; and
a protection circuit for protecting the LED module in case of generation of high voltage,
wherein one of the two first pins is connected to a front end of the LED module and the other one of the two first pins is grounded to be electrically insulated from the LED module.

10. A light emitting diode lamp, comprising:
two first pins which are provided at one side thereof;
two second pins which are provided at the other side thereof;
a light emitting diode (LED) module which is disposed between the two first pins and the two second pins;
a circuit connecting at least two of the two first pins and the two second pins to the LED module; and
a protection circuit for protecting the LED module in case of generation of high voltage,
wherein the protection circuit comprises a bridge diode which interconnects the two first pins in a state of non-polarity, and
wherein one of the two first pins is connected to a front end of the LED module via the bridge diode and one of the two second pins is grounded to be electrically insulated from the LED module.

11. A light emitting diode lamp, comprising:
two first pins which are provided at one side thereof;
two second pins which are provided at the other side thereof;
a light emitting diode (LED) module which is disposed between the two first pins and the two second pins;
a circuit connecting at least two pins of the two first pins and the two second pins to the LED module; and
a protection circuit including a bridge diode which interconnects the two first pins in a state of non-polarity and a fuse which is inserted into a front end of the LED module to protect the LED module in case of generation of high voltage,
wherein one of the two first pins is connected to the front end of the LED module via the bridge diode, and
wherein the two second pins are grounded to be electrically insulated from the LED module.

12. A light emitting diode lamp, comprising:
two first pins which are provided at one side thereof;
two second pins which are provided at the other side thereof;
a light emitting diode (LED) module which is disposed between the two first pins and the two second pins;
a circuit connecting at least two of the two first pins and the two second pins to the LED module; and
a protection circuit including a bridge diode which interconnects the two first pins in a state of non-polarity,
wherein one of the two first pins is connected to a front end of the LED module via the bridge diode, and
wherein the two second pins are grounded to be electrically insulated from the LED module.

* * * * *